J. ERICKSON.
RELAY.
Reissued Apr. 6, 1920.
14,834.
APPLICATION FILED MAR. 1, 1920.
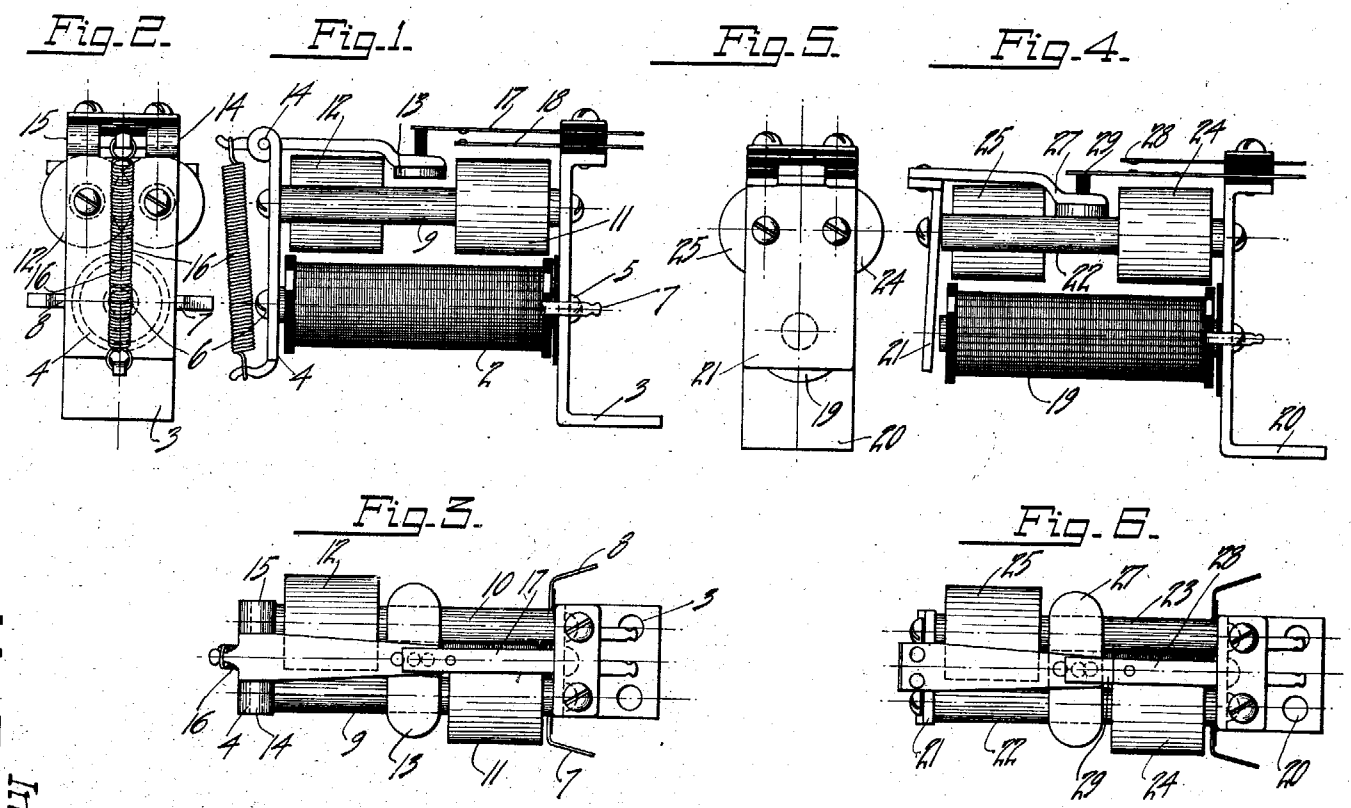
Inventor:
John Erickson.
E. B. Gilles
Attorney.

UNITED STATES PATENT OFFICE.

JOHN ERICKSON, OF CHICAGO, ILLINOIS, ASSIGNOR TO AUTOMATIC ELECTRIC COMPANY, OF CHICAGO, ILLINOIS, A CORPORATION OF ILLINOIS.

RELAY.

14,834. Specification of Reissued Letters Patent. Reissued Apr. 6, 1920.

Original No. 1,330,020, dated February 3, 1920, Serial No. 206,318, filed December 8, 1917. Application for reissue filed March 1, 1920. Serial No. 362,346.

*To all whom it may concern:*

Be it known that I, JOHN ERICKSON, a citizen of the United States of America, and a resident of Chicago, county of Cook, and State of Illinois, have invented certain new and useful Improvements in Relays, of which the following is a specification.

My invention relates to electromagnetic circuit closing devices, and more specifically to a relay for closing any kind of a circuit.

One of the objects of my invention is to provide a relay which may be connected in circuit with sources of either alternating or direct current and which may be arranged to operate with the direct current only or with alternating current only, or which may operate in a particular manner with both alternating current and direct current.

Another object of my invention is to provide a relay which utilizes the Wheatstone bridge principle as applied to magnetic flux rather than to electric current and in which the armature of said relay forms the bridge across the arms of a Wheatstone bridge corresponding to the receiver or galvanometer bridge.

Another object of my invention is to provide a relay which may be connected in circuit with a direct current and which will attract its armature momentarily when the circuit is closed and again only momentarily when the circuit is broken.

My invention is adapted for various uses such as in a telephone system in which a relay is desired which will not operate with ringing current but which will operate with direct or operating current. Also in power work such a device may be used to great advantage.

Other features and objects of my invention will be pointed out in the specification by referring to the accompanying drawings in which—

Figure 1 shows one form of my improved relay.

Fig. 2 is an end view of the relay shown in Fig. 1 taken from the left of said figure.

Fig. 3 is a top view of the relay in Fig. 1.

Fig. 4 shows another form of my improved relay, and Figs. 5 and 6 are, respectively, an end view and a top view of the relay shown in Fig. 4.

I will now describe my invention more in detail. Referring to Figs. 1, 2 and 3, I have shown a coil 2 mounted upon an iron mounting bracket 3 at one end by means of the screw 5, and having another iron pole piece 4 firmly secured to the other end thereof by means of the screw 6. The coil 2 has a pair of terminals 7 and 8 to which any desired circuit may be connected. Firmly mounted between the upper extending ends of the brackets 3 and 4 are a pair of parallel soft iron cores or rods 9 and 10, which are secured by iron screws to the two brackets 3 and 4. On the right hand end of the core 9 is firmly attached a copper slug 11 and on the left hand end of the core 10 is secured another copper slug 12. These two copper slugs are mounted far enough apart to leave space for the armature 13 which is pivoted at the points 14 and 15 and held normally away from the cores 9 and 10 by means of the coil spring 16, thereby maintaining a pair of springs 17 and 18 normally out of contact. At certain times to be pointed out hereinafter, the pole pieces 9 and 10 will be charged as opposite poles pieces and will therefore attract the armature 13 to close the contact of springs 17 and 18.

The relay which I have described and which is shown in Figs. 1, 2 and 3 is designed so that the armature 13 will be attracted only when alternating current is flowing through the coil 2. Also the armature 13 will be attracted momentarily whenever a direct current is applied to the coil 2, and will again be momentarily attracted when the direct current is removed from the circuit of said coil. It will be seen that the path of the magnetic flux caused by applying a direct current to the winding of the coil 2 includes the core of said coil, the bracket 3, the cores 9 and 10 in multiple, the heel piece 4, and back to the core of coil 2. As is well known in the art, the copper slugs 11 and 12 have a retarding action which acts against any change in the magnetic flux flowing in their respective cores 9 and 10 so that when a magnetic flux is set up around the above traced circuit its increase or decrease in strength will be opposed at two places, that is, the flux in the right hand end of the core 9 will be opposed by the counter force set up in the slug 11, and the magnetic flux in the core 10 will be opposed in the left hand end of said core by the counter action of the slug 12. Thus it will be seen that the mid points of the cores 9 and 10 will act as north and south magnetic poles and cause the armature 13 to be attracted to said mid points, thereby short circuiting magnetically the two slugs 11 and 12. The magnetic flux will now flow from the core of coil 2, bracket 3, coil 10, to the mid point thereof, armature 13, and on through the left hand half of core 9, and through pole piece 4 to the core of coil 2. As soon, however, as the magnetic flux in the two cores 9 and 10 has reached its maximum point and the counter force generated in the slugs 11 and 12 dies down, the cores 9 and 10 will form a free path to the flux and the armature 13 will fall back. In the same manner when the direct current circuit through the coil 2 is opened the slugs 11 and 12 will again oppose the decrease in flux in the two cores 9 and 10 and the armature 13 will again be momentarily attracted by the counter magnetic force generated therein. It will be seen that I have utilized the Wheatstone bridge principle as applied to flux rather than electric current and that the coil 2 and its core act as the battery bridge, the left hand end of the core 10 and the right hand end of the core 9 act as the variable arms and the right hand end of the core 10 and the left hand end of the core 9 act as the fixed arms of said bridge, while the armature 13 acts as the receiver or galvanometer arm. Therefore when the two variable arms are changed in resistance relative to the fixed arms by the counter action of the slugs, a pull is exerted on the armature 13.

Now, when an alternating current is supplied to the winding of the coil 2 it will be seen that, as the alternating current is continually changing in direction, the magnetic flux in the cores 9 and 10 will never be steady and therefore the counter force in each slug 11 and 12 which is caused by a change in the flux of the cores 9 and 10, will be maintained constant and the armature 13 will therefore be held in its attracted position.

In Figs. 4, 5 and 6 I have shown another form of my improved relay which acts in a much different manner. This relay is designed to be slow to energize when direct current is applied thereto and quick to de-energize when the direct current is removed. Also this relay is not responsive to alternating current. In Figs. 4, 5 and 6 I have shown a relay which is very similar to the relay shown in Figs. 1, 2 and 3, except that its armature is pivoted in a different manner so as to respond to direct current. In these figures a coil 19 is shown mounted on a heel piece 20. Firmly secured to the upper end of this heel piece are a pair of parallel cores 22 and 23 which correspond to cores 9 and 10 of Fig. 1 and which have slugs 24 and 25 mounted thereon. On the opposite end of the cores 22 and 23 is loosely mounted or hinged, an armature 21 having a tail piece 27 which extends back to the mid point of the cores 22 and 23 and is normally held against said cores by the spring 29, which, therefore, also holds the armature 21 away from the core of the coil 19. This relay will operate in the following manner. When direct current is applied to the coil 19 a flux will be generated which follows a path from the core of coil 19 through heel piece 20, cores 22 and 23 in parallel, through the armature 21 and back to the core of said coil. The armature 21 will not be attracted at once, however, due to the pull which is exerted on the tail piece 27, which is held against the cores 22 and 23 until the counter action of the slugs 24 and 25 is overcome, in the same manner in which the armature 13, Fig. 1, was attracted, at which time the force exerted on the tail piece 27 will die out and the armature 21 will pull up and close the contact of springs 28 and 29 to close any desired circuit. Now when an alternating current is applied to the terminals of the coil 19, the tail piece 27 will be held permanently against the cores 22 and 23 in the same manner as was the armature 13 in Fig. 1, so that the armature 21 will not have a chance to pull up.

Therefore it will be seen that I have devised a very efficient and novel relay which is adapted for many uses and which may be arranged to close an alarm circuit or signal circuit momentarily when a direct current circuit is closed and again when it is opened and which will not hold up on direct current. Also it may be used when it is desired to have a relay which will be slow to energize with direct current and which will not energize with alternating current.

Having fully described my invention what I desire to protect and secure by Letters Patent will be pointed out in the appended claims.

What I claim as my invention is:

1. In a relay, a magnet, an armature for said magnet, means for applying direct and alternating current to said magnet, means for preventing said armature from being attracted when alternating current is applied to said magnet, means for causing said armature to be slow in pulling up when direct current is applied to said magnet and means for causing said armature to fall back quickly when said direct current is removed.

2. In a relay, a magnet, an armature for said magnet pivoted at one point and having two arms extending therefrom at right angles to each other, means for applying currents of different characters to said magnet, means for attracting said armature in one direction when current of one character is applied and in the other direction when current of another character is applied to said magnet.

3. In a relay, a magnet, an armature for said magnet pivoted at one point and having two arms extending in two directions therefrom, means for applying alternating and direct current to said magnet, means for attracting one of said arms when alternating current is applied to said magnet and for attracting the other of said arms when direct current is applied to said magnet.

4. In a relay, a magnet, an armature for said magnet, means for applying direct and alternating current to said magnet, means for preventing said armature from being attracted when alternating current is applied to said magnet, means for causing said armature to be slow in pulling up when direct current is applied to said magnet, means for causing said armature to fall back quickly when said direct current is removed, and a circuit controlled by said relay.

5. In a relay, a magnet, an armature for said magnet pivoted at one point and having two arms extending therefrom at right angles to each other, means for applying currents of different characters to said magnet, means for attracting said armature in one direction when current of one character is applied and in the other direction when current of another character is applied to said magnet, and a circuit controlled by said relay.

6. In a relay, a magnet, an armature for said magnet pivoted at one point having two arms extending in two directions therefrom, means for applying alternating and direct current to said magnet, means for attracting one of said arms when alternating current is applied to said magnet and for attracting the other of said arms when direct current is applied to said magnet, and a circuit controlled by said relay.

7. In a relay, a magnet, an armature for said magnet pivoted at one point and having two arms extending therefrom at right angles to each other, means for applying currents of different characters to said magnet, means for attracting said armature in one direction when current of one character is applied and in the other direction when current of another character is applied to said magnet, and a circuit controlled by only one of said operations.

8. In a relay, a magnet, an armature for said magnet pivoted at one point having two arms extending in two directions therefrom, means for applying alternating and direct current to said magnet, means for attracting one of said arms when alternating current is applied to said magnet and for attracting the other of said arms when direct current is applied to said magnet, and a circuit controlled by only one of said operations.

9. In a relay, a magnet, a magnetic circuit for said magnet having parallel branches, an armature for said magnet bridged across said parallel branches, said branches at times short circuiting said armature magnetically, and means for removing said short circuit to cause said armature to be attracted.

10. In a relay, a magnet, a magnetic circuit for said magnet, said magnetic circuit comprising a Wheatstone bridge having a pair of permanent arms and a pair of variable arms, an armature for said magnet, said armature bridged across the points between the variable and permanent arms, means for causing a magnetic flux to flow in said circuit, means for varying the reluctance of said variable arms, to cause the magnetic flux to flow through said armature and attract the same.

11. In a relay, a magnet, a magnetic circuit for said magnet, said magnetic circuit comprising a Wheatstone bridge having a pair of permanent arms and a pair of variable arms, an armature for said magnet, said armature bridged across the points between the variable and permanent arms, means for causing a magnetic flux to flow in said circuit, means for varying the reluctance of said variable arms, to cause the magnetic flux to flow through said armature and attract the same.

12. An electromagnet having a magnetic circuit, a portion of said magnetic circuit comprising a Wheatstone bridge having two arms which are of low reluctance to magnetic flux generated by alternating current, and two arms which are of high reluctance to flux generated by alternating current, said arms having equal reluctance to flux generated by a contiuous flow of direct current, an armature for said magnet having two points of said bridge as its pole pieces, whereby when an alternating flux passes through said bridge, said pole pieces will be charged as opposite poles and attract said armature.

13. An electromagnet having a magnetic circuit, a portion of said magnetic circuit comprising a Wheatstone bridge having two arms which are of low reluctance to a magnetic flux generated by alternating current, and two arms which are of high reluctance to flux generated by alternating current, said arms having equal reluctance to flux generated by a continuous flow of direct current, an armature for said magnet, having two points of said bridge as its pole pieces, whereby when an alternating flux passes through said bridge, said pole pieces will be charged as opposite poles and attract said armature, and whereby when a steady or direct current flux passes through said bridge said armature will not be attracted.

14. An electromagnet, a magnetic circuit for said magnet having a pair of parallel branches, means for causing a magnetic flux to flow in said circuit, means at one end of one of said branches for choking the lines of force in said branch, and means near the other end of said other branch for choking the lines of force in said other branch, an armature for said magnet, bridged across said branches between said choking means, whereby when the strength of said magnetic flux is rising in strength the lines of force are caused to flow through said armature to attract the same.

15. A magnetic circuit having parallel branches, means for causing a magnetic flux to flow in said circuit, means at one end of one branch for opposing any change in strength of said magnetic flux, means at the other end of the other branch for opposing any change in strength of said flux, a circuit controller forming a bridge across said parallel branches at the mid-point thereof and out of engagement therewith, whereby when said magnetic flux is rising in strength said magnetic flux is caused to flow through said circuit controller to attract the same to said branches.

16. A magnetic circuit having parallel branches, means for causing a magnetic flux to flow in said circuit, means at one end of one branch for opposing any change in strength of said magnetic flux, means at the other end of the other branch for opposing any change in strength of said flux, a circuit controller forming a bridge across said parallel branches at the mid-point thereof and out of engagement therewith, whereby when said magnetic flux is rising in strength said magnetic flux is caused to flow through said circuit controller to attract the same to said branches, and a circuit controlled by said controller.

Signed by me at Chicago, Cook county, Illinois, this first day of December, 1917.

JOHN ERICKSON.